United States Patent [19]

Lopiccolo

[11] Patent Number: 4,546,466

[45] Date of Patent: Oct. 8, 1985

[54] OPTICAL ENCODER USING TIME DOMAIN AND WAVELENGTH MULTIPLEXING

[75] Inventor: Mario T. Lopiccolo, Southington, Conn.

[73] Assignee: United Technologies Corporation, Hartford, Conn.

[21] Appl. No.: 566,005

[22] Filed: Dec. 27, 1983

[51] Int. Cl.$^4$ .............................................. H04B 9/00
[52] U.S. Cl. .......................................... 370/3; 370/4; 455/612
[58] Field of Search ............... 370/1, 2, 3, 4; 455/612, 610, 617; 350/96.15, 96.16

[56] References Cited

U.S. PATENT DOCUMENTS 3,521,068  7/1970  Armstrong ............................... 370/4

OTHER PUBLICATIONS

Kurzweil, F., Jr., "Optical Digital-Analog Detector" IBM Technical Disclosure Bulletin, vol. 11, No. 5, Oct. 1968.

Primary Examiner—Robert L. Griffin
Assistant Examiner—Timothy K. Greer
Attorney, Agent, or Firm—Francis J. Maguire, Jr.

[57] ABSTRACT

In a position measurement system having a plurality of redundant pulsed light sources, detectors, control circuits, signal conditioning circuits, and signal processors, but having space available for only a single encoder for measuring the position of a monitored device, the pulsed light sources emitting light of different wavelengths which are combined in wavelength multiplexed fashion at the encoder, the combined light then being split for encoding and recombining in time domain multiplexed fashion, the recombined light then being split for filtering of the different wavelengths at the plurality of light detectors each of which provide signal manifestations indicative of the position of the monitored device according to the encoded light pulses of the particular wavelength monitored to the associated control and signal conditioning circuits for transmittal to an associated signal processor.

4 Claims, 3 Drawing Figures

4,546,466

OPTICAL ENCODER USING TIME DOMAIN AND WAVELENGTH MULTIPLEXING

DESCRIPTION

1. Technical Field

This invention relates to optical encoders, and more particularly to time domain and wavelength multiplexed fiber optic encoders.

2. Background Art

Optical encoders utilizing fiber optics are well known in the art, such devices providing optical integration and read-out of information encoded on an optical mask. The information is imprinted on the mask in the form of multiple binary signal bits with the binary state characterized by the light transmissive or opaque state of the associated signal bit locations between two major surfaces of the mask. The transparent signal bits provide a complete light transmission path between the surfaces of the mask from a light source, such as a light emitting diode (LED) or laser diode (LD) to a light receiver, such as an optical detector. The opaque regions provide interruption of the light path. The light transmission, or non-transmission through the mask determines the particular signal bit logic state, i.e., one or zero.

In the simplest embodiment, for a mask having an N number of signal bits, there are N number of light sources and N number of light receivers, each with its associated fiber optic path. The sources and detector are arranged in pairs, one pair dedicated to each signal bit location. The number of light sources and associated fiber optic paths can be reduced by using a single light source to illuminate all of the signal bits at one time; the presence or absence of light through individual signal bit locations being determined by individual light detectors. Alternatively a single light receiver and path may be used with N number of separate light sources; the individual light sources being sequenced to discriminate signal bit locations. In this manner the number of either the light sources or light receivers may be reduced to one; but not both.

Signal multiplexing may be used to reduce both the number of light sources and receivers to less than N, as disclosed in U.S. Pat. No. 4,117,460 of common assignee herewith, to Walworth et al. As shown by Walworth et al, the N signal bit locations of the mask are connected through N fiber optic paths to $N^{\frac{1}{2}}$ light receivers and light detectors arranged so as to provide, in effect, a square matrix of equal rows and columns; one light source for each column and one light detector for each row. Each source is activated to provide column illumination and the light detectors are polled to detect the presence or absence of light at particular signal bit row locations. This reduces the number of sources and receivers required, although it does not permit use of a single light source with a single light receiver, nor does it reduce the number of fiber optic paths required to provide light transmission to the N signal bit locations of the mask.

Use of a single light source and a single light receiver such that the number of fiber optic paths required is reduced to a minimum is accomplished by splitting a serial sequence of primary pulses from a single pulsed source into an array of secondary light pulses, each sequence of secondary pulses being delayed by an individually selected interval, the difference in delay periods between each succeeding secondary pulse sequence being equal. The difference in delay intervals of each succeeding delay line corresponds to at least one period of the pulsed source repetition rate. Each of the secondary pulse sequences is thus presented in timed sequence to an associated bit location at one surface of an optical mask in a related one of successive pulse window time intervals. The timed transmission of each secondary pulse through the mask is combined with all the other secondary pulses in a combiner which transmits all of the other secondary pulses in a serial signal stream to an optical detector which provides signal manifestations in response to the presence of each secondary pulse, the presence or absence of a signal manifestation in each successive pulse window time interval providing a serial signal representation of the mask encoded information.

It is often required to utilize several independent optical encoders using time domain multiplexing in order to provide a desired degree of redundancy However, in some such situations the space available for more than one optical mask with its associated receiver, transmitter, delay lines, splitter, and combiner is severely restricted. However, since many of the breakdowns in such optical encoding apparatus occur in the large numbers of delicate fiber optic lines required in such a redundant system, it may actually be desirable in some cases to restrict the redundancy to outside the encoder. In other words, if there is a need for a redundant optical encoder system using time domain multiplexing and there is only the space available for a single encoder, a need exists to satisfy these requirements.

DISCLOSURE OF INVENTION

The object of the present invention is to provide redundant optical encoder apparatus using only a single optical mask and associated transmitter, receiver, and delay lines.

According to the present invention, a light wavelength signal encoding apparatus includes a plurality of pulsed light sources each having different light wavelengths and each pulsed at a selected pulse repetition rate; the primary pulses output from each source are combined in wavelength multiplexed fashion in a combiner-splitter which splits the wavelength multiplexed primary pulses on a single line into a plurality of secondary pulses each of the plurality of secondary pulses being delayed by a successively longer period, each sequence of secondary pulses presented in timed sequence to an associated parallel bit location at a surface of the optical mask in a related one of successive pulse window time intervals; the timed transmission of each secondary pulse through the mask parallel bit locations are multiplexed into a real time serial signal stream of light pulses in a combiner which also splits the time and wavelength multiplexed serial signal stream into a plurality of output serial signal streams, each output stream presented to an associated filtered optical detector, each detector responsive only to light having a wavelength corresponding to the wavelength of the light transmitted by an associated pulsed light source, each optical receiver providing a signal manifestation in response to the presence of each secondary pulse, the presence or absence of the signal manifestation in each successive pulse window time interval providing a serial signal representation of the mask encoded information.

The optical encoder of the present invention allows the use of redundant light sources and receivers with a single encoder. Although the systems are not fully redundant in the sense of being completely independent, the degree of redundancy achieved is maximized considering the design constraint of having only space available for one encoder. Since many of the components prone to breakdown in such systems are located in the control and signal conditioning units, the pulsed sources, and the optical detectors, many of the reasons for desiring a redundant system at the outset are solved. That this is an acceptable compromise may be emphasized by considering the nature of the encoder portion of the apparatus which is of a simple design with only one moving part and no active electronic elements. These and other objects, features and advantages of the present invention will become more apparent in the light of the following detailed description of an exemplary embodiment thereof as illustrated in the accompanying drawing.

BEST MODE FOR CARRYING OUT THE INVENTION

Figure 1:
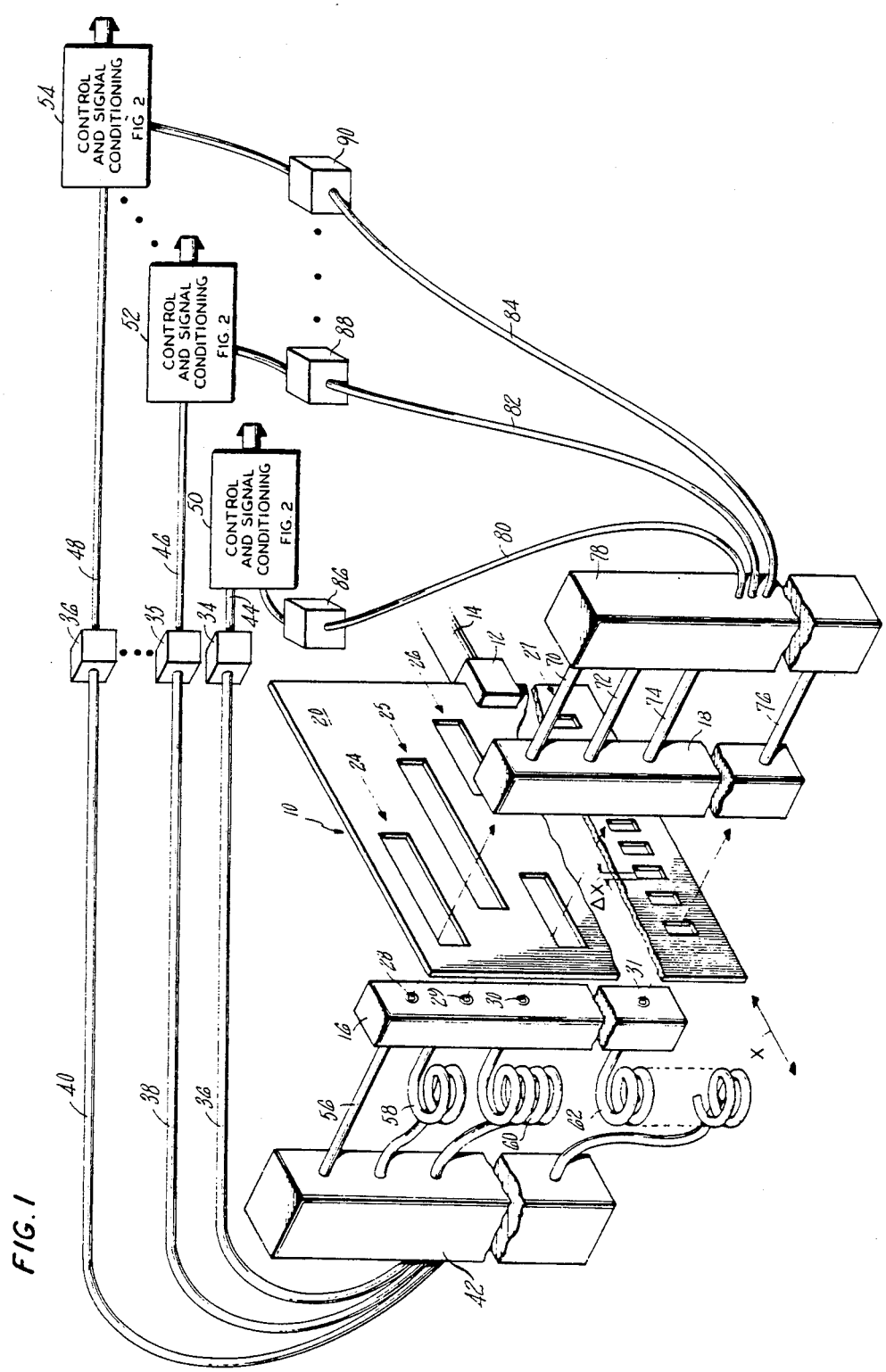
FIG. 1 is a simplified perspective illustration, not to scale, of the redundant optical encoder of the present invention as used in combination with a fiber optic position sensor.

Referring to FIG. 1, which is a perspective illustration of the present invention as may be used in a fiber optic position sensor of the type disclosed in U.S. Pat. No. 4,116,000, of common assignee herewith, to Martin et al. A position sensor code plate 10 is attached through a mechanical connector 12 and shaft 14 to the device whose position is to be sensed, allowing the code plate to be displaced through a light transmission path established between a light transmitting block 16 and a light receiving block 18. The code place includes an optical mask 20 with a plurality of signal bit locations 24–27 which in FIG. 1 are encoded in a selected Gray code. The Gray code permits signal information to be encoded indicative of the linear displacement at granularity intervals $\Delta X$ and, for a given stationary position of the mask in the light transmission path, provides a uniquely coded signal by virtue of the transparent and opaque regions transmitting and blocking light in each channel. It should be understood that although illustrated for use with a linear fiber optic position sensor the encoder of the present invention is not limited to such use, and may be used with any type of encoding device, including angle measuring rotary masks.

The transmitting and receiving blocks each include an equal plurality of light apertures, which correspond to the termination of fiber optic lines in each block. The apertures are disposed on the face of each block in a linear array, along an axis coincident with the signal bit locations to be read from the mask. The transmitting block includes light apertures 28–31, each in registration with an associated one of the signal bit locations 24–27. The receiving block light apertures (not shown in FIG. 1) are similarly arrayed, such that each receiving block light aperture is in alignment with a counterpart located in the transmitting block and light from the transmitting block apertures is received by the associated receiving light apertures in the absence of interruption of the particular light path by opaque regions on the mask.

A plurality of pulsed light sources 34, 35, 36 each emit light having a wavelength different from the others. Pulses from each pulsed light source are transmitted on fiber optic lines 36, 38, 40 and are combined in a fiber optic junction (not shown in FIG. 1) in an optical power combiner-splitter 42 which combines the various wavelengths of light into a single wavelength multiplexed signal. A plurality of pulsed light sources 34, 35, 36 are utilized in order to provide a degree of system redundancy in a system in which the space available for the encoding mask 20 and its associated combiners, splitters, receivers, transmitters, etc., is limited. In other words, in fully redundant systems each pulsed light source would be associated with its own encoder and would be independent of any other systems. However, where encoder space available is limited, it may be necessary to use the same encoder in each redundant system. This is often permissible since many of the faults experienced in the field occur outside the encoder. It should be understood that the drawbacks of using only a single encoder for all of the redundant systems may be ameliorated by utilizing a dual head encoder in which redundant optical masks are imprinted on a single plate. In that case, redundance combiners, splitters, transmitters, receivers, etc., are used. Each pulsed light source 34, 35, 36 is turned on in response to a gate signal provided on lines 44, 46, 48 from controll and signal conditioning circuitry 50, 52, 54, respectively, described in detail hereinafter with respect to FIG. 2. When gated on, each source provides a light pulse of intensity (I), with a real time pulse with ($T_N$) determined by the duration of the applied gate signal. The source light pulse, or primary pulse is transmitted through the fiber optic lines 36, 38, 40 to the combiner-splitter 42 which causes the three distinct trains of serial pulses of different light wavelengths to be comined at a junction and then split into N number of secondary trains of wavelength multiplexed serial light pulses corresponding to the number of signal bit locations to be encoded by the optical mask. In FIG. 1, N=4 (signal bit locations 24–27); however, any number of secondary pulses may be provided with a light source of sufficient intensity to be split into the desired number.

Although each of the secondary light pulses is made up of light having a particular wavelength, the secondary light pulses themselves also have a spatial pulse width, i.e., the spatial distance occupied by the source light pulse of real time pulse width (T) propagating at the group velocity ($V_g$) through fiber optic lines 56, 58, 60, . . . 62. As known, the group velocity is equal to $V_g = C/n_g$; where C is the velocity of light in free space, or $3 \times 10^8$ meters/second, and $n_g$ is the group index of refraction for the material media (core and cladding) of the fiber optic line. In the absence of dispersion the spatial pulse width (P) is defined as follows: $P = T \cdot V_g$. For the short length runs of fiber optic lines used in the present encoder the dispersion effects are negligible. Each secondary light pulse has a spatial pulse width equal to that of its associated source pulse, and each are presented simultaneously from the combiner-splitter 42 to one end of an associated one of a plurality (N) of optical delay lines 56–62, the other ends of which are terminated in an associated one of the light apertures 28–31 of the transmitter block 16. The delay lines are fiber optic lines of the same material, but of different length. The line lengths (L) increase successively, beginning with a first delay line (56) to the last, or $N_{th}$ line (62), in successive, substantially equal increment length values ($\Delta L$). For a line 56 length $L_o$, the length of the next line 58 is $L_1 = L_o + \Delta L$, the line 60 has a length $L_2 = L_1 + \Delta L$, and so on up the last line of length $L_N = L_{N-1} + \Delta L$. This incremental length $\Delta L$ is selected to provide at least one full spatial pulse width for the pulsed source having the shortest pulse width (if they are different) between successive delay lines, and is typically twice the spatial pulse width of the secondary optical pulses. For a primary, or source pulse having a real time band width of T equals 10 nanoseconds and propagating through a doped fused quartz (silicon dioxide) fiber optic line having a group index of refraction of 1.46: the group velocity is $2.05 \times 10^8$ meters/second, the spatial pulse width is 2.05 meters, and the value of $\Delta L$ is on the order of 4 meters. The $\Delta L$ value is selected to provide sufficient temporal separation of the secondary light pulses at the face of the transmitting block 16, such that the higher the value of $\Delta L$ the greater the time separation between adjacent pulses.

Figure 3:
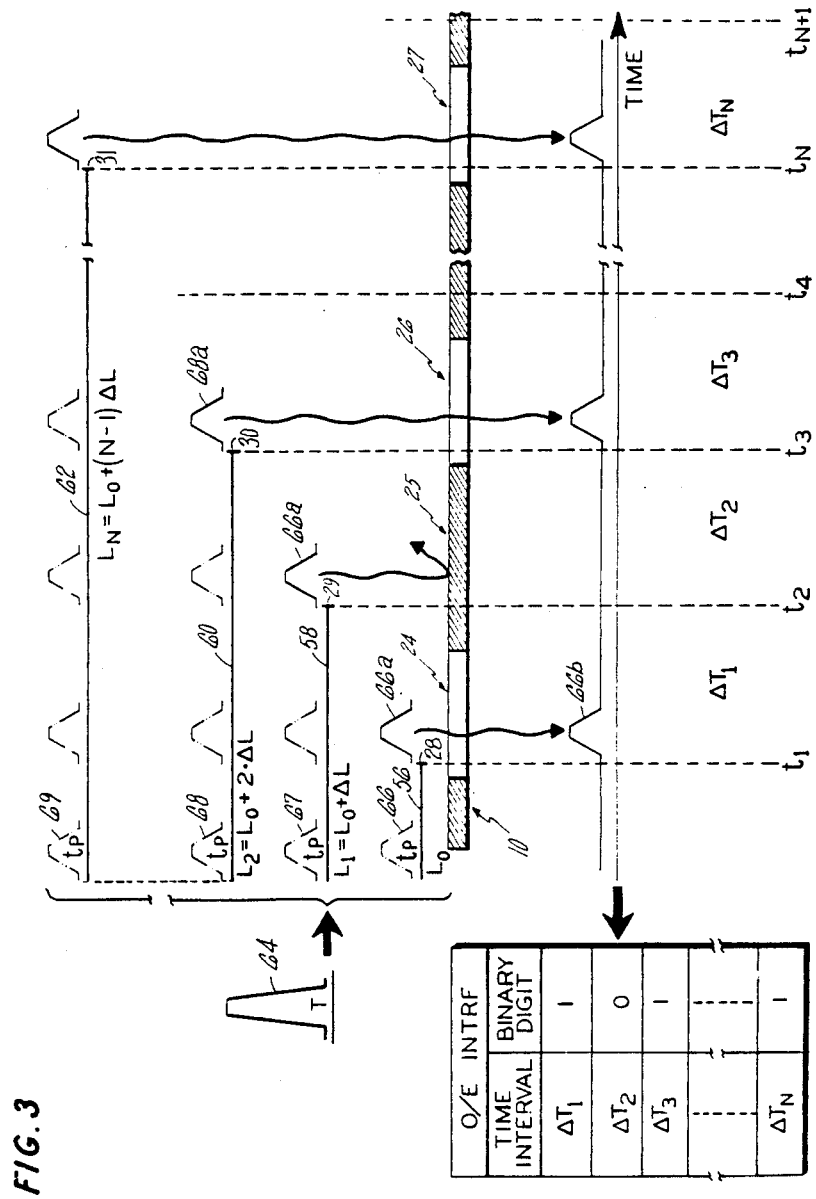
FIG. 3 is an illustration of the operating characteristics of an optical encoder of FIGS. 1 and 2.

Referring now to FIG. 3, in a simplified time based illustration of the time domain multiplexing for the optical encoder of the present invention, the primary light pulse 64 from one of the pulsed light sources 34, 35, 36 with real time pulse width T is divided by the combiner-splitter (42 FIG. 1) into N secondary pulses which are presented simultaneously to the inputs of the associated delay lines 56–62 (FIGS. 1, 3). It should be understood that a similar representation could be made for each of the pulse trains associated with each of the primary signal sources. FIG. 3 is merely an illustration of one of the pulse trains that is wavelength multiplexed on the lines 56–62. The line lengths for the lines 56–62 are illustrated as $L_o$ through $L_n$, each succeeding line being longer than the immediately preceding line in the array by the value $\Delta L$. As a result, the propagation time for each secondary pulse increases with succeeding delay lines by a real time increment $\Delta T = L/V_g$.

For the first line 56, the secondary pulse 66 is incident ($66_a$) at the light aperture 28 of the transmitting block 16 at time $t_1$. In the presence of a light transmissive path through the associated signal bit location 24, the pulse propagates through the code plate 10 and is incident ($66_b$) at the receiver block 18. The pulse 67 on the line 58 is incident ($66_a$) at the transmitter light aperture 29 at time $t_2$, where $t_2 - t_1 = \Delta T_1$, the time duration of the pulse window interval, i.e., the difference time delay between successive delay lines. For the assumed opaque region of signal bit location 25 the pulse is prevented from propagating through the mask to the receiver within the $\Delta T_3$ pulse window interval, the upper limit of which ($t_3$) is the time that the succeeding pulse 68 is incident ($68_a$) at the light aperture 30 and propagates through the mask bit location 26 to the receiving block. If the presence or absence of a light pulse at the receiver is designated one or zero, then for intervals $\Delta T_1 - \Delta T_3$ the received intelligence is 101. Each succeeding pulse similarly appears at the face of the transmitting block in successive, equal $\Delta T$ intervals and, depending on the encoded signal bit location associated with each, either appears at the receiver or is blocked by the code plate. The light incident at the receiver, therefore, appears as a real time series of light pulses in the nature of a serial signal bit stream, where the presence or absence of a light pulse in a given time interval provides a manifestation of the signal state of the associated one of the signal bit locations. The position of a given pulse in the serial stream beginning with the first pulse ($62_b$), together with the known value $\Delta T$ intervals in which the presence or absence of a light pulse should occur, allows for immediate identification of the signal state of each signal bit location. Since the information encoded on the code plate 10 is in binary form (transparent or opaque) the series light pulses appear directly in binary form, as illustrated by the table of FIG. 3. It is to be emphasized that FIG. 3 is an illustration for only one of the series light pulses wavelength multiplexed on the lines 56–62. A similar sketch could as easily have been drawn for any of the other serial light pulses generated by the various pulsed light sources 34, 35, 36 of FIG. 1.

Referring again to FIG. 1, the light pulses received at the light apertures of the receiving block 18 are transmitted in parallel through associated fiber optic lines 70–76 to a combiner-splitter 78. Each of the fiber optic lines 70–76 provide an equal propagation time delay for each pulse, such that received pulses from each pulsed source appear at the combiner-splitter at essentially the same associated $\Delta T$ pulse window interval. The combiner-splitter couples the received pulses into a single fiber optic junction (not shown) in the combiner-splitter 78, i.e., each pulse propagating through the mask is time multiplexed into one of the several serial optical pulse signals superimposed by wavelength multiplexing, one of which is illustrated in FIG. 3. The combiner-splitter 78 splits the single fiber optic junction into a plurality of output fiber optic lines 80, 82, 84, each of which propagates all of the time and wavelength multiplexed serial optical pulse signals to respective light receivers 86, 88, 90.

It should be understood that the delay lines 56–62 shown in FIG. 1 between the combiner-splitter 42 and the transmitter 16 could as easily have been illustrated between the receiver 18 and the combiner-splitter 78. It is immaterial whether the delay takes place before encodment or after.

Figure 2:
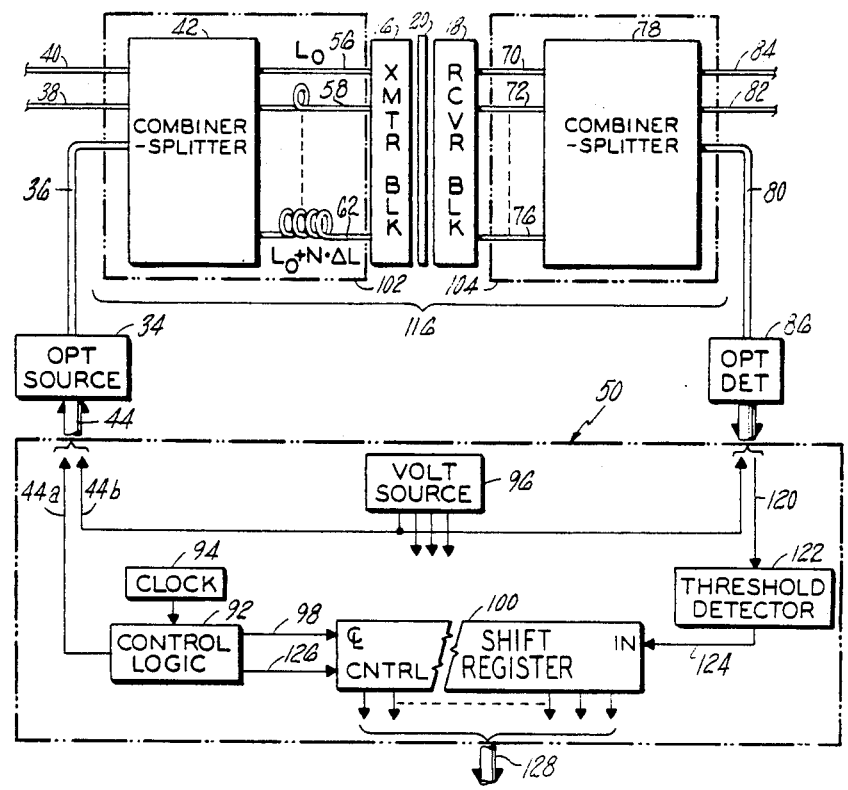
FIG. 2 is a simplified system block diagram of one of the redundant optical encoders of the present invention as used in combination with a fiber optic position sensor.

Referring now to FIG. 2, a block diagram illustration of one of the control and signal conditioning units 50, 52, 54 (FIG. 1) as used in the present encoder is shown. The signal conditioning circuitry 50 shown in FIG. 2 (as well as the signal conditioning circuitry 52, 54 not shown) includes control logic 92 responsive to a clock 94 which provides the system time base. The control logic provides gate signals on a line 44a included within the lines 44 (FIG. 1) together with the voltage excitation from a voltage source 96 provided on lines 44b, to the pulsed light source, or optical transmitter 34 (FIG. 1). The gate signals in each control and signal conditioning unit 50, 52, 54 are at a selected pulse repetition frequency (PRF) and real time pulse width (T) which may be the same or different as between the various control and signal conditioning units. For delay line $\Delta L$ values providing a plural number (M) of spatial pulse width intervals of delay between successive secondary light pulses (referring now to light pulses of a single frequency, i.e., from a single light source), the resultant time separation, or "pulse window" time interval $\Delta T = M \cdot T$ and the signal bit frequency $F = 1/T$. The total cycle time for the particular control and signal conditioning unit under discussion for an N signal bit encoder $T_s = N \cdot \Delta T$ and the PRF $= 1/T_s$. For the assumed: $\Delta T = 10$ nanoseconds (ns), and a two spatial pulse width separation between delay lines (M=2), the pulse window time interval $\Delta T = 20$ nanoseconds and the signal bit frequency $F = 50 \times 10^6$ bits per second (50

MBps) for a 12 bit encoder (N=12) the cycle time $T_s$=240 ns and the PRF is approximately 4.2 MHz. Of course, each of the pulsed light sources 34, 35, 36 may be controlled at a completely different PRF from any of the others.

The frequency of the clock 94 is selected to provide a time base interval equal to the pulse window time interval $\Delta T$. This time base signal is provided on a line 98 from the control logic 92 to an N bit shift register 100 which, as described hereinafter, may provide serial to parallel conversion of the series electrical pulse signal provided by the optical receiver.

Each of the optical sources provides its output on a fiber optic line 36, 38, 40 as described in detail hereinbefore in connection with FIG. 1, to a transmitter portion 102 having a combiner-splitter 42 which provides secondary pulses through the transmitter block 16 to the mask 20. The secondary pulses propagating through the mask are incident at the receiver block 18 and presented to the receiver portion 104 of the multiplexer 116. The receiver portion includes the signal bit fiber optic lines 70-76, the combiner-splitter 78, and the output lines 80, 82, 84. The output of the receiver portion is repeated on each output line 80, 82, 84 and consists of a wavelength and time multiplexed serial signal stream of light pulses which is presented through each output line 80, 82, 84 to an associated optical detector 86, 88, 90.

The optical detector for each control and signal conditioning unit includes a filter which transmits only light having a wavelength corresponding to the emitted light wavelength from the associated pulsed source 34, 35, 36. After transmitting light of the proper wavelength the optical detector transduces the light intensity of each received secondary pulse into a proportional magnitude voltage signal which is presented through lines 120 to the control circuit 50 and received at a threshold detector 122, of a type known in the art. The threshold voltage limits are selectable and are established for the particular application. The signal output from the detector, which is a series pulse stream, may be signal conditioned within the general threshold detection circuitry to provide any selected signal processor compatible format. The output signal pulses from the threshold detector are presented through lines 124 to the input of the shift register 100 which shifts the signal in at the input in succeeding $\Delta T$ intervals as established by the clock signal on the line 98, the presence or absence of a pulse in each interval corresponding to a one or zero logic state respectively. In this manner, the appearance of the signal at the output from the threshold detector is uniquely defined as associated with a known $\Delta T$ interval beginning with the first interval corresponding to the first secondary pulse of the temporal array presented to the optical mask assembly. This allows identification of the presence or absence of a signal within a given T interval as being associated with a given one of the signal bit locations of the optical mask.

The synchronization of the $\Delta T$ time base on the line 86 with the pulse window time intervals for the temporal array of secondary pulses is provided for the particular application by clearing and inhibiting the shift register for a fixed time delay, defined as the time interval between the pulsed turn-on of the particular light source 34, 35, 36 and the time at which the secondary pulse associated with the first signal bit location of the mask may be expected to appear at the output of the associated threshold detector. This is achieved by the control logic 92 which enables the shift register with a gate signal on a line 126 at the end of the transport time delay, following the gate on of the light source. The shift register, which may include a number of shift registers in cascade depending on the total number of signal bits to be decoded, provides the data from the N number of signal locations as N bits of information from a least significant bit (LSB) to a most significant bit (MSB), which is provided on the lines 128 (FIGS. 1, 2) as the output from the light wavelengths signal encoding apparatus.

The use of wavelength and time multiplexing to reduce the number of fiber optic lines required in a redundant system enables a plurality of computers (not shown) to access the same transducer simultaneously or randomly without cross talk or interference. It is accomplished by using light sources having different optical wavelengths in each pulsed source.

Although the invention has been shown and described with respect to illustrated embodiments thereof, it should be understood by those skilled in the art that the foregoing and various other changes, omissions, and additions in the form and detail thereof may be made therein without departing from the spirit and the scope of the invention.

I claim:

1. A light wavelength signal encoding apparatus, comprising: plural pulsed light source means, each providing primary light pulses, each having a different light source wavelength, each propagating on a corresponding one of a first plurality of input fiber optic lines, each of said sources pulsed at an associated selected real time pulse width interval;

first combiner-splitter means, responsive to each of said primary light pulses for combining said first plurality of input fiber optic lines at an input to a first fiber optic junction and for splitting said first fiber optic junction at an output thereof into a second plurality of transmitter fiber optic lines, each of said second plurality of transmitter fiber optic lines having all of said primary light pulses propagating thereon at reduced intensity in a wavelength multiplexed stream of secondary light pulses;

time delay means, having a second plurality of time delay fiber optic lines, each responsive at input ends thereof to a corresponding one of said second plurality of secondary light pulses on an associated transmitter fiber optic line, for delaying the propagation of each succeeding stream of secondary pulses by successively longer time intervals, the difference time delay between succeeding delayed streams being equal;

encoder means, including a transmitter portion a positionable mask portion having a spatial code with light transmissive and opaque regions in an array of channels imprinted thereon, and a receiver portion; said transmitter portion being responsive to said delayed streams of wavelength multiplexed secondary light pulses for presenting each of said second plurality of transmitter fiber optic lines in a spatial array on one side of said mask, said transmitter having each of said second plurality of transmitter fiber optic lines aligned with one channel of said array of channels; said mask portion transmitting and blocking selected ones of said delayed streams of wavelength multiplexed (secondary) light pulses according to said spatial code and said mask's position; said receiver portion having a second plurality of receiver fiber optic lines arrayed in alignment with said second plurality of transmitter fiber optic lines, responsive to said transmitting and blocking of said selected ones of said delayed streams of wavelength multiplexed secondary light pulses for propagation thereof;

second combiner-splitter means, responsive to each of said delayed streams of wavelength multiplexed secondary pulses on said second plurality of receiver fiber optic lines, for combining said receiver fiber optic lines at output ends thereof at an input to a second fiber optic junction thereby combining said delayed streams in a time multiplexed manner and for splitting said second fiber optic junction at an output thereof into a first plurality of output fiber optic lines, each of said first plurality of output fiber optic lines having all of said time and wavelength multiplexed secondary light pulse streams propagating thereon;

plural filter means, each responsive to one of said streams of secondary light pulses on an associated one of said first plurality of output fiber optic lines, each filter transmitting only serial light pulses of an associated wavelength in said streams of secondary light pulses; and plural filtered light receiver means, each associated with an associated one of said filter means, each responsive to said light pulses transmitted by said associated filter, for providing in response to the presence and absence of a transmitted pulse in each successive real time pulse width interval, output signal manifestations of the position of said positionable mask.

2. The encoder of claim 1, further comprising:

plural clock means, one for each of said plural pulses light source means, each providing a clock signal having a time period equal to that of said associated selected real time pulse width interval;

plural shift register means, each associated with one of said plural filtered light receiver means, and one of said plural clock means each connected for response to said output signal manifestations of its associated receiver means and responsive to said clock signal from its associated clock means, and plural encoder control means, each associated with one of said light source means and with one of said shift register means, for providing in one or more succeeding pulse repetition periods, a first gate signal to said associated light source means for energizing said associated source for a time equal to said associated selected real time pulse width interval of said associated source and, after a time delay interval (equal to the time required for each of said pulsed light signals to propagate from said source through said encoder to said associated shift register means) following presentation of said first gate signal to said light source, providing a second gate signal to said associated shift register means to enable said associated shift register means, at a time coincident with the presentation of each propagated and nonpropagated serial light pulse in succession to said associated filtered light receiver means, to register the presence and absence of said signal manifestations from said associated light receiver means in each succeeding clock signal period in the presence of said second gate signal.

3. A light wavelength signal encoding apparatus, comprising:

plural pulsed light source means, each providing primary light pulses, each having a different light source wavelength, each propagating on a corresponding one of a first plurality of input fiber optic lines, each of said sources pulsed at an associated selected real time pulse width interval;

first combiner-splitter means, responsive to each of said primary light pulses for combining said first plurality of input fiber optic lines at an input to a first fiber optic junction and for splitting said first fiber optic junction at an output thereof into a second plurality of transmitter fiber optic lines, each of said second plurality of transmitter fiber optic lines having all of said primary light pulses propagating thereon at reduced intensity in a wavelength multiplexed stream of secondary light pulses;

encoder means, including a transmitter portion, a positionable mask portion having a spatial code with light transmissive and opaque regions in an array of channels imprinted thereon, and a receiver portion; said transmitter portion being responsive to said wavelength multiplexed secondary light pulses for presenting each of said second plurality of transmitter fiber optic lines in a spatial array on one side of said mask, said transmitter having each of said second plurality of transmitter fiber optic lines aligned with one channel of said array of channels; said mask portion transmitting and blocking selected ones of said wavelength multiplexed secondary light pulse streams according to said spatial code and said mask's position; said receiver portion having a second plurality of receiver fiber optic lines arrayed in alignment with said second plurality of transmitter fiber optic lines, responsive to said transmitting and blocking of said selected ones of said wavelength multiplexed secondary light pulse streams for propagation thereof;

time delay means, having a second plurality of time delay fiber optic lines, each responsive at input ends thereof to said transmitting and blocking of a selected one of said selected ones of said wavelength multiplexed secondary light pulse streams propagated on said receiver fiber optic lines, for delaying the propagation of each successive one of said wavelength multiplexed secondary pulse streams by successively longer time intervals, the difference time delay between succeeding lines being equal;

second combiner-splitter means, responsive to each of said delayed streams of wavelength multiplexed secondary pulses on said second plurality of time delay fiber optic lines, for combining said time delay fiber optic lines at output ends thereof at an input to a second fiber optic junction thereby combining said delayed streams in a time multiplexed manner and for splitting said second fiber optic junction at an output thereof into a first plurality of output fiber optic lines, each of said first plurality of output fiber optic lines having all of said time and wavelength multiplexed secondary light pulse streams propagating thereon;

plural filter means, each responsive to one of said streams of secondary light pulses propagating on an associated one of said plurality of fiber optic output lines, each filter transmitting only light having a wavelength corresponding to said light source wavelength of an associated pulsed light source; and plural filtered light receiver means, each associated with an associated one of said filter means, each responsive to said light trarsmitted by said associated filter, for providing in response to the presence and absence of a transmitted pulse in each successive real time pulse width interval, output signal manifestations of the position of said positionable mask.

4. The encoder of claim 3, further comprising:

plural clock means, one for each of said plural pulses light source means, each providing a clock signal having a time period equal to that of said associated selected real time pulse width interval;

plural shift register means, each associated with one of said plural filtered light receiver means, and one of said plural clock means each connected for response to said output signal manifestations of its associated receiver means and responsive to said clock signal from its associated clock means, and plural encoder control means, each associated with one of said light source means and with one of said shift register means, for providing in one or more succeeding pulse repetition periods, a first gate signal to said associated light source means for energizing said associated source for a time equal to said associated selected real time pulse width interval of said associated source and, after a time delay interval (equal to the time required for each of said pulsed light signals to propagate from said source through said encoder to said associated shift register means) following presentation of said first gate signal to said light source, providing a second gate signal to said associated shift register means to enable said associated shift register means, at a time coincident with the presentation of each propagated and nonpropagated serial light pulse in succession to said associated filtered light receiver means, to register the presence and absence of said signal manifestations from said associated light receiver means in each succeeding clock signal period in the presence of said second gate signal.

* * * * *